(12) United States Patent
Lim et al.

(10) Patent No.: US 7,539,457 B2
(45) Date of Patent: May 26, 2009

(54) METHOD AND APPARATUS FOR COMMUNICATING WITH SEVEN OR MORE TERMINALS EFFICIENTLY IN BLUETOOTH SYSTEM

(75) Inventors: Jae Sung Lim, Suwon-si (KR); Soon Jin Choi, Seongnam-si (KR); Eui Hyeok Kwon, Suwon-si (KR)

(73) Assignee: Ajou University Industry Corporation Foundation, Suwon-Si, Kyeonggi-Do (KR)

( * ) Notice: Subject to any disclaimer, the term of this patent is extended or adjusted under 35 U.S.C. 154(b) by 962 days.

(21) Appl. No.: 10/822,325

(22) Filed: Apr. 12, 2004

(65) Prior Publication Data

US 2004/0214527 A1    Oct. 28, 2004

(30) Foreign Application Priority Data

Apr. 11, 2003   (KR) ............... 10-2003-0022980

(51) Int. Cl.
*H04B 7/00*   (2006.01)
(52) U.S. Cl. ............. 455/41.2; 370/318; 370/338; 370/348; 370/361
(58) Field of Classification Search ............ 455/42.1; 370/310–350
See application file for complete search history.

(56) References Cited

U.S. PATENT DOCUMENTS

| | | | |
|---|---|---|---|
| 6,807,159 B1* | 10/2004 | Shorey et al. | 370/318 |
| 6,975,613 B1* | 12/2005 | Johansson | 370/338 |
| 2002/0018458 A1* | 2/2002 | Aiello et al. | 370/348 |
| 2002/0064134 A1* | 5/2002 | Lee et al. | 370/252 |
| 2002/0159544 A1* | 10/2002 | Karaoguz | 375/329 |
| 2002/0193073 A1* | 12/2002 | Fujioka | 455/41 |
| 2003/0021288 A1* | 1/2003 | Hayashi et al. | 370/461 |
| 2003/0060161 A1* | 3/2003 | Park | 455/41 |

* cited by examiner

*Primary Examiner*—Duc Nguyen
*Assistant Examiner*—Zhiyu Lu
(74) *Attorney, Agent, or Firm*—Ober / Kaler; Royal W. Craig

(57) ABSTRACT

Disclosed are a method and an apparatus for communicating with seven or more terminals in a Bluetooth system of a Wireless Personal Area Network (W-PAN). In the method and apparatus, a sniff mode allowing slaves to be in a sleep state for a Sniff Interval Time (SIT) is converted into an active mode for a service such that a master can efficiently communicate with seven or more slaves using conventional seven Active Member Addresses (AM_ADDR).

17 Claims, 11 Drawing Sheets

METHOD AND APPARATUS FOR COMMUNICATING WITH SEVEN OR MORE TERMINALS EFFICIENTLY IN BLUETOOTH SYSTEM

CROSS-REFERENCE TO RELATED FOR APPLICATIONS

Pursuant to 35 U.S.C. 119(a) the present application derives priority from the following foreign filed patent application: Korean Patent Application No. 2003-22980 filed Apr. 11, 2003.

BACKGROUND OF THE INVENTION

1. Field of the Invention

The present invention relates to a method and apparatus for communicating with seven or more terminals efficiently in a Bluetooth Wireless Personal Area Network (W-PAN), and more particularly, to a communication method and apparatus utilizing the sniff mode to allow a terminal to be in a sleep state for a Sniff Interval Time (SIT) and then be converted into an active mode for a service period in order to communicate such that a master can efficiently communicate with seven or more slaves using conventional seven Active Member Addresses (AM_ADDR).

2. Description of the Background

A Bluetooth system is a wireless communication technique in which short-range devices such as a computer, mobile phone, a headset, a printer, a PDA, a notebook, electric home appliances, etc. are connected using a wireless connection network to enable duplex communication even without a complicated wire. The Bluetooth system is highlighted as a principal element for mobile communications, owing to its advantages such as low-priced equipment and wide-ranging applications. In recent years, service of the Bluetooth system have centered on mobile phones, headsets, etc. using the Bluetooth protocol.

Communications between Bluetooth devices is based on a master-slave connection utilizing a synchronized frequency jumping pattern and clock. The Bluetooth device that establishes the frequency jump sequence from which to request a connection and maintains the master clock is called the "master." The Bluetooth device that synchronizes to the frequency jump sequence of the master and maintains time synchronization with the master clock by implementing an internal offset of its own clock in response to a connection request is called a "slave".

Bluetooth devices in a standby mode can detect the addresses and approximate clock offset values of other Bluetooth devices through an inquiry and inquiry scan process. Once identified, a connection between Bluetooth devices (nodes) can be constructed through a paging and paging scan process in which the frequency jumping pattern is established.

A connection between one master and one or more slaves is called "piconet", and each of the slaves is distinguished using a 3-bit Active Member Address (AM_ADDR). FIG. 1 is a view illustrating a piconet consisting of one master and several slaves in a conventional Bluetooth system. As shown in FIG. 1, the 3-bit active addressing scheme limits a piconet to one master and seven slaves in active mode.

Accordingly, in one piconet, only seven slaves can perform communications at a given time, and excess slaves over and above the seven addressable are allocated a Park Member Address (PM_ADDR) and an Access Request Address (AR_ADDR) from the master. These devices then release their Active Member Address (AM_ADDR) for use by other devices and enter a parking mode. They are then considered to be in a sleep state and this procedure is called "parking".

When a parked slave again requires to communicate with the master the Access Request Address is used to transmit the access request message to the master through a beacon channel. The master receives the access request message and checks its communication resources to determine if an Active Member Address (AM_ADDR) is or can be made available. If so, it then accepts the call. This procedure is called "unparking".

A Bluetooth piconet utilizes a Time Division Duplex (TDD) scheme controlled by the master to communicate with the member slaves. The master transmits a data packet or a control packet to the slave indicating that the slave has been allocated the subsequent time slot to transmit its data packet to the master.

The process of transmitting a data or control packet by the master to the slave in order to allocate a time slot to the slave is called "polling". If a slave polled by the master has data to be transmitted, the data packet is transmitted in response. If no data exists to be transmitted by the slave, a null packet is transmitted.

As described above, the conventional Bluetooth system cannot, in one piconet, provide service for more than seven slaves. In one Bluetooth piconet, if communication with more than seven Bluetooth devices is required, two conventional methods are used.

In a first method, described above, a slave in active mode is converted into parking mode and the returned Active Member Address (AM_ADDR) is then allocated to a new slave so as to provide service. This method has a drawback in that one or more active slaves are forcibly interrupted and placed in park mode thereby resulting in deteriorating the quality of service. Further, this conventional method has another drawback in that service delays are lengthened and the efficiency of a throughput is decreased due to the long delay time for the parking or the un-parking of slaves.

In another method of communicating with more than seven slaves, a Scatternet is used. A connection between multiple piconets is called "Scatternet" and is created when a device resides as a slave on one piconet and a master on another. This conventional method has the drawback that, for various reasons such as the fact that the present Bluetooth standard does not define a detailed protocol for this service, it is not yet possible to implement.

SUMMARY OF THE INVENTION

Accordingly, the present invention is directed to a method and apparatus for communicating with seven or more terminals in a Bluetooth system that substantially obviate one or more problems due to limitations and disadvantages of the related art.

An object of the present invention is to provide method and apparatus for communicating with seven or more terminals in a Bluetooth system, in which a multiple access scheme is provided for enabling a master to efficiently communicate with seven or more slaves thereby improving a system performance and being used in various appliances.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for communicating with seven or more terminals in a Bluetooth system having a master and a plurality of slaves, the method including the steps of: checking to determine if an Active Member Address is available to be allocated to a new slave in order for the master to establish a communication connection with the slave; when an Active Member Address remains available, allocating the remaining Active Member Address to the slave, and when no Active Member Address remains available, calculating a service delay time and comparing the calculated delay time with a predetermined reference value; when the service delay time is larger than the predetermined reference value, rejecting a call acceptance, and when the service delay time is smaller than the predetermined reference value, determining a service sequence with respect to a predetermined reference according to the number of the slave calculated at a pre-scheduling duration; allocating a sniff interval time and an Active Member Address to each of the slaves according to the service sequence, and converting the slaves allocated and given a sniff interval time and an Active Member Address to sniff mode; and waking-up a slave from sniff mode at the sniff interval time at which time it can use the Active Member Address to complete the communication with the master and return the Active Member Address.

In another aspect of the present invention, there is provided a communication method with seven or more terminals in a Bluetooth system having a master and a plurality of slaves, the method including the steps of: transmitting an access request message from a parked slave to the master so as to establish a communication connection therebetween; receiving the access request message so as to calculate the number of the parked slave and determine a service sequence with respect to a predetermined reference; allocating an Active Member Address according to the service sequence so as to establish the communication connection, and maintaining a non-connection slave to be in a sleep state in a sniff mode; and waking-up the slave of the sniff mode at the sniff interval time such that the active member address is used to complete data transmission with the master and return to a parking mode.

In a further aspect of the present invention, there is provided an apparatus for communicating with seven or more terminals in a Bluetooth system having a master and a plurality of slaves, the apparatus including: a transceiver for transmitting and receiving a signal between the master and the slave; a parking mode controller for analyzing the signal received from the transceiver so as to control the number of a parked slave, a data type and the number of packet, and a parameter necessary for a parking mode; a pre-scheduling unit for analyzing the signal received from the transceiver so as to determine a service sequence, a sniff interval time and an active member address; and a controller for controlling the parking mode controller, the transceiver and the pre-scheduling unit such that the slave is activated according to the service sequence so as to perform the communication.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and, together with the description, serve to explain the principle of the present invention. In the drawings.

DETAILED DESCRIPTION OF THE INVENTION

Reference will now be made in detail to the preferred embodiments of the present invention, examples of which are illustrated in the accompanying drawings.

Figure 1:
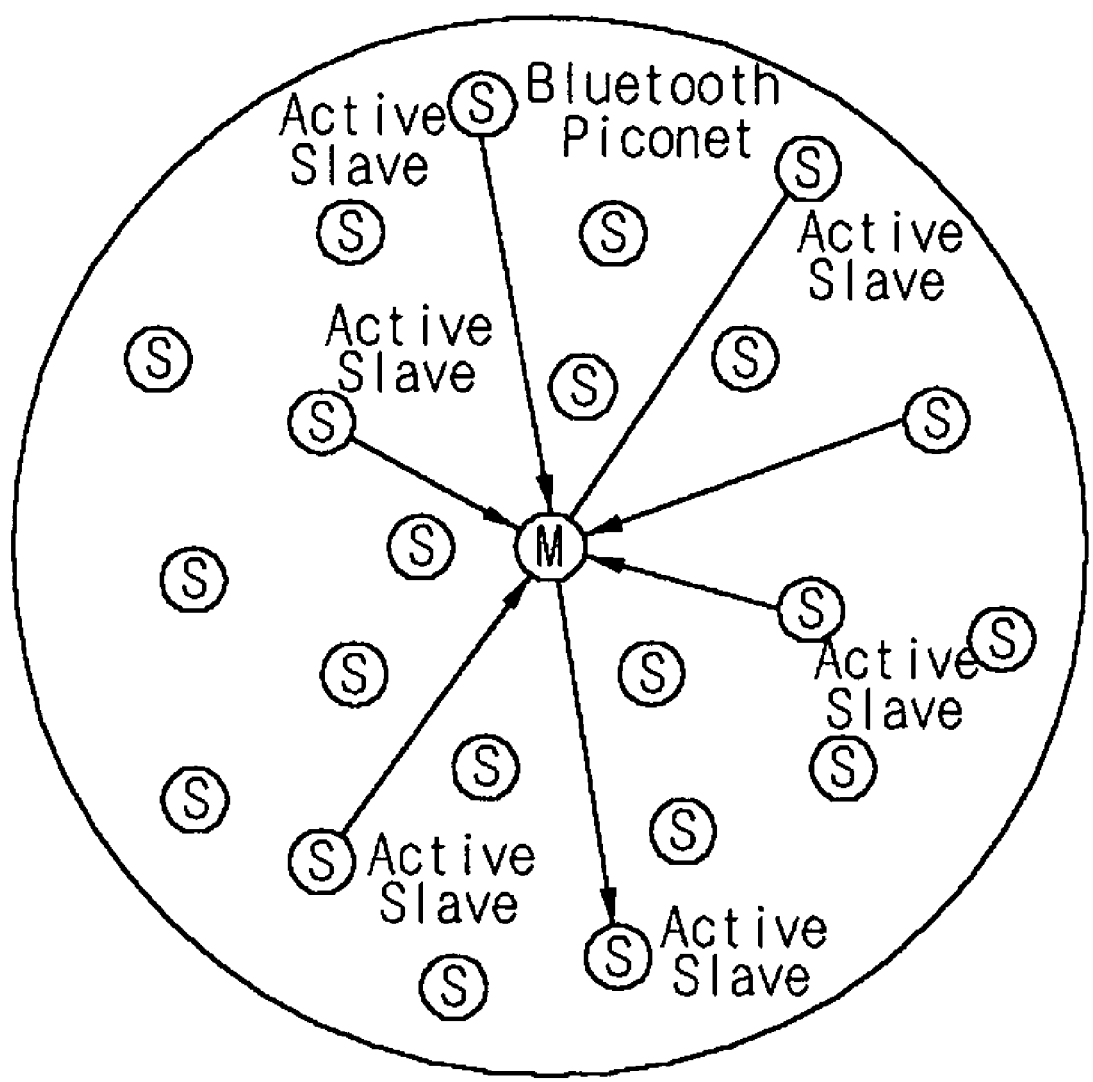
FIG. 1 is a view illustrating a piconet consisting of one master and several slaves in a conventional Bluetooth system.
Figure 2:
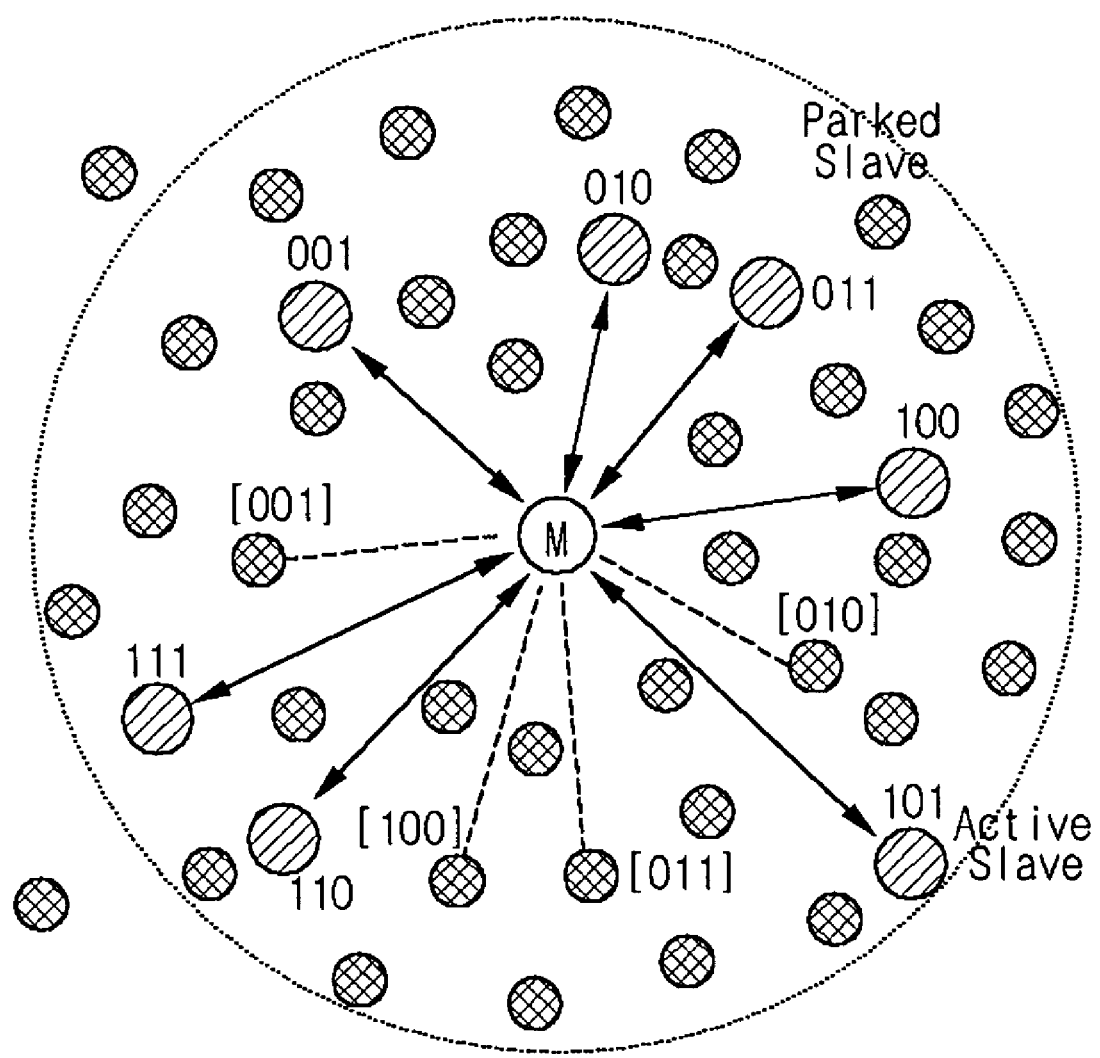
FIG. 2 is a view illustrating a piconet in which a master efficiently communicates with seven or more slaves according to a preferred embodiment of the present invention.

FIG. 2 is a view illustrating a piconet in which a master efficiently communicates with seven or more slaves according to a preferred embodiment of the present invention. Referring to FIG. 2, a Bluetooth system includes a master for managing all communications in the piconet, and a plurality of slaves for communicating with the master. Further, the plurality of slaves can be operated in various modes such as a hold mode, a sniff mode and a parking mode. A slave now having a communication connection with the master is called an "active slave", and a slave not having a communication connection with but synchronizing to the master is called a "parked slave". The master distinguishes each of the active slaves using 3-bit active member address (AM_ADDR) (001~111). Parked slaves are not allocated an Active member Address.

Figure 3:
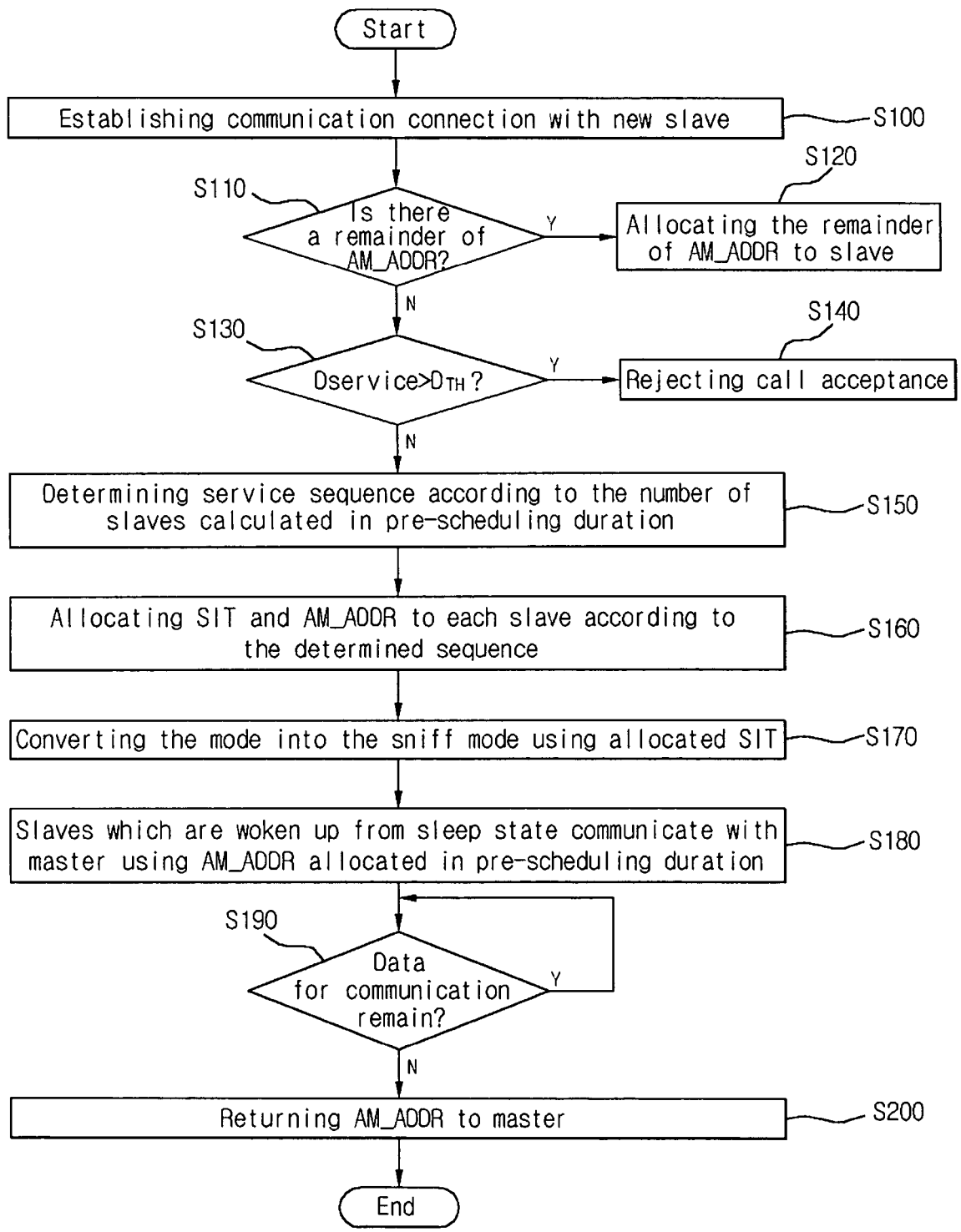
FIG. 3 is a flowchart illustrating an operation procedure of a Bluetooth system in a piconet according to a preferred embodiment of the present invention.
Figure 4:
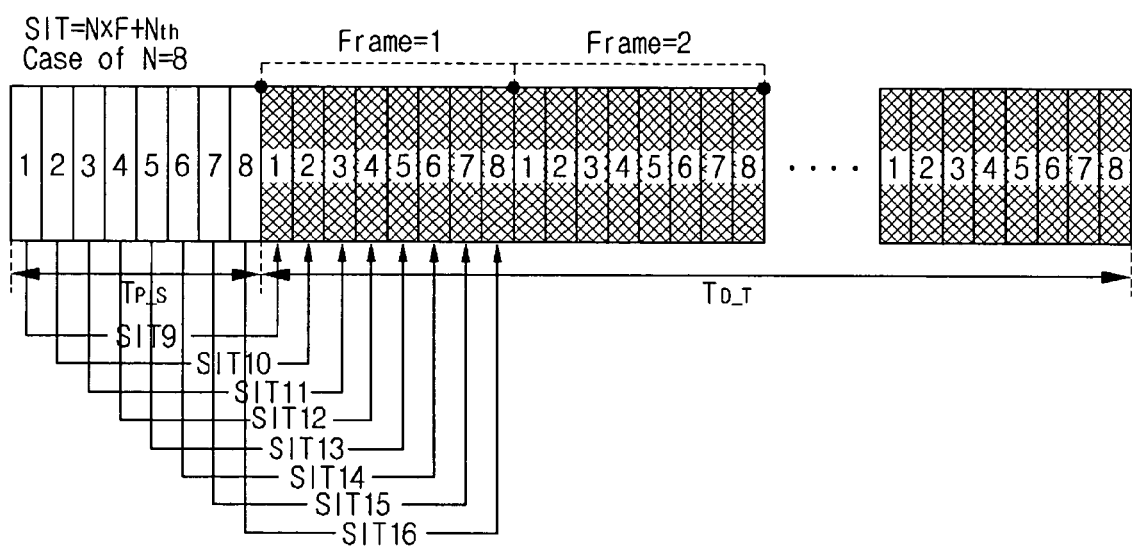
FIG. 4 is a timing diagram illustrating an operation procedure according to a preferred embodiment of the present invention.

FIG. 3 is a flowchart illustrating an operation procedure of the Bluetooth system in the piconet according to a preferred embodiment of the present invention, and FIG. 4 is a timing diagram illustrating an operation procedure when the number of slaves is equal to 8 in the piconet (N=8).

First, in order to commence communication, the master respectively allocates the active member addresses (001-111) to the slaves such that the slaves are distinguished from one another to perform the communication (S100). Accordingly, where the master establishes a call for a connection with a new slave it checks to see if an Active Member Address is presently unassigned and thus available to be allocated to the new slave (S110). If an active member address is available to be to be allocated, the master allocates the existing active member address to the slave requesting the communication (S120). However, where seven or more slaves are already connected and allocated Active Member Addresses such that there are no additional Active Member Addresses to be allocated, the traffic load of the master is measured to determine whether the master can accept the additional slaves (S130). The traffic load represents the delay time taken to store and serve a packet in a queue of the master, and it is desirable that the calculation result be expressed in terms of transmission slot units.

Equation 1:

$$D_{service} = \frac{\sum_{Slave=1}^{U} N_{slave}}{\mu} < D_{TH}$$

Herein, "$N_{slave}$" represents an average of the number of packet stored in a queue for each slave for a predetermined time period, and "$\mu$" represents an average of the number of packets transmitted from the master. Accordingly, if a value of the delay time ($D_{SERVICE}$) taken for the master to process pending communications is larger than a reference value ($D_{TH}$), the master determines that it can no longer accept additional slaves and rejects the communications request call (S140). If the value ($D_{SERVICE}$) is smaller than the reference value ($D_{TH}$), the master accepts the communications request call and converts the call requesting slave to sniff mode until present communications of the active slaves are finished. The call requesting slave remains in the sleep state for a data transmission duration ($T_{D\_T}$).

In FIG. 4 illustrating a timing diagram for an operation procedure according to a preferred embodiment of the present invention, there is illustrated a state of the call acceptance for eight slaves as an embodiment. At this time, according to the number of slave calculated for a pre-scheduling duration ($T_{P\_S}$), the master determines a sequence of services (S150), and thus allocates, to the slave that intends to enter the sniff mode, a Sniff Interval Time (SIT) represented by the number of the slot and the Active Member Addresses (AM_ADDR) (001-111) that is used for the slave to communicate with the master after being woken-up at the sniff interval time (SIT) (S160).

The following equation 2 is an example for obtaining the sniff interval time.

$$SIT = N*F + N_{th}$$

Herein, "N" is the number of slaves intending to communicate with the master at present, "F" is a frame unit as a service sequence of the frame, and "$N_{th}$" is a slave position in one frame. For example, the sniff interval time of an eighth slave in a first frame is calculated as follows:

$$SIT = 8*1 + 8 = 16$$

Data transmission of the slave is repetitively performed during the data transmission duration in the frame unit. That is, each of the slaves uses a polling way using a poll packet, but the data transmission is performed using a Time Division Multiple Access (TDMA) way of transmitting data according to a predetermined sequence.

The master manages a slave identification (ID) and the Active Member Address used in the slave, while it communicates with a number of slaves.

Table 1 is an example of a mapping table of the master, and Table 2 is an example of a mapping table of the slave.

TABLE 1

| Slave ID | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|
| AM_ADDR | 001 | 010 | 011 | 100 | 101 | 110 | 111 | 001 | 010 | 011 | 100 | 101 | 110 | 111 | 001 | 010 |
| SIT | 9 | 10 | 11 | 12 | 13 | 14 | 15 | 16 | 17 | 18 | 19 | 20 | 21 | 22 | 23 | 24 |

TABLE 2

| AM_ADDR | 001 | 010 | 011 | 100 | ... | 010 |
|---|---|---|---|---|---|---|
| SIT | 16 | 24 | 32 | 40 | ... | 998 |

In the above cases, the active member address 001 is jointly allocated to the slave 1, slave 8 and slave 7. Accordingly, the slave 1 is first under data service, and the remaining slave 8 and slave 7 enter the sleep state through the sniff mode (S170). At this time, after the slave 8 and the slave 7 are woken up after the sniff interval times (SIT) different from each other, they use the active member address (001) so as to communicate with the master. That is, the slave 8 and slave 7 are woken up after the sniff interval time (SIT) following the time when the service of the slave 1 is finished such that they can receive the poll packet of the master so as to communicate with the master (S180). Next, the slave 7 checks whether data to be communicated remains and as a result, in a case where it is determined that all data are communicated, the active member address is returned to the master (S190)(S200).

The communication method according to another embodiment of the present invention will be described hereinafter.

One master manages the piconet consisting of a number of slaves. Slaves not performing data communication with the master may be maintained in a parking mode in order to conserve power. The parked slaves are distinguished from one another using an 8-bit Park Member Address (PM_ADDR), and they can use the 8-bit Access Request Address (AR_ADDR) so as to transmit an access request message to the master.

Figure 5:
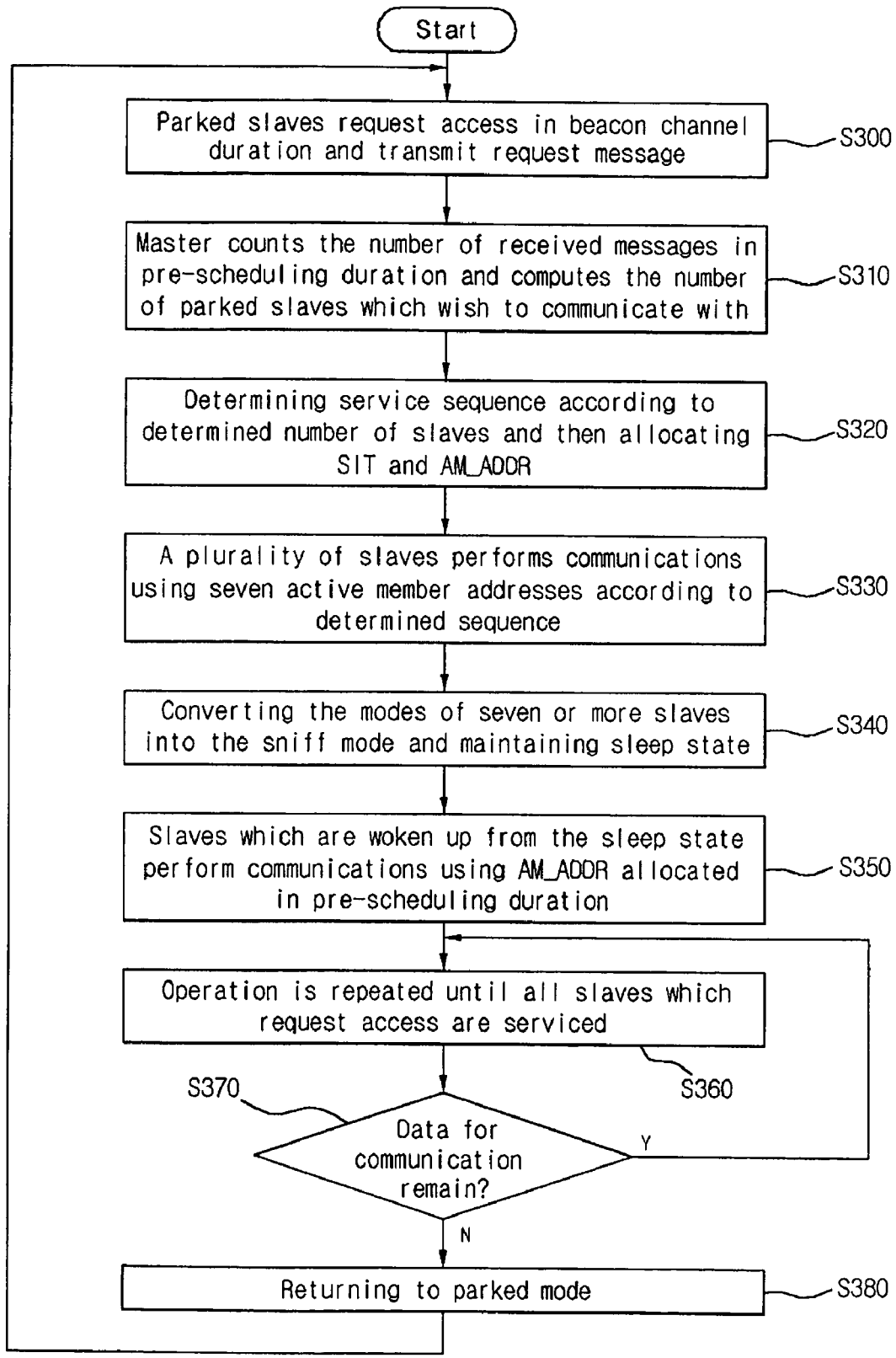
FIG. 5 is a flowchart illustrating an operation procedure in a Bluetooth system performing the communication with seven or more slaves using a parking mode according to a preferred embodiment of the present invention.

FIG. 5 is a flowchart illustrating an operation procedure in the Bluetooth system performing communications with seven or more slaves using the parking mode according to a preferred embodiment of the present invention.

Figure 6:
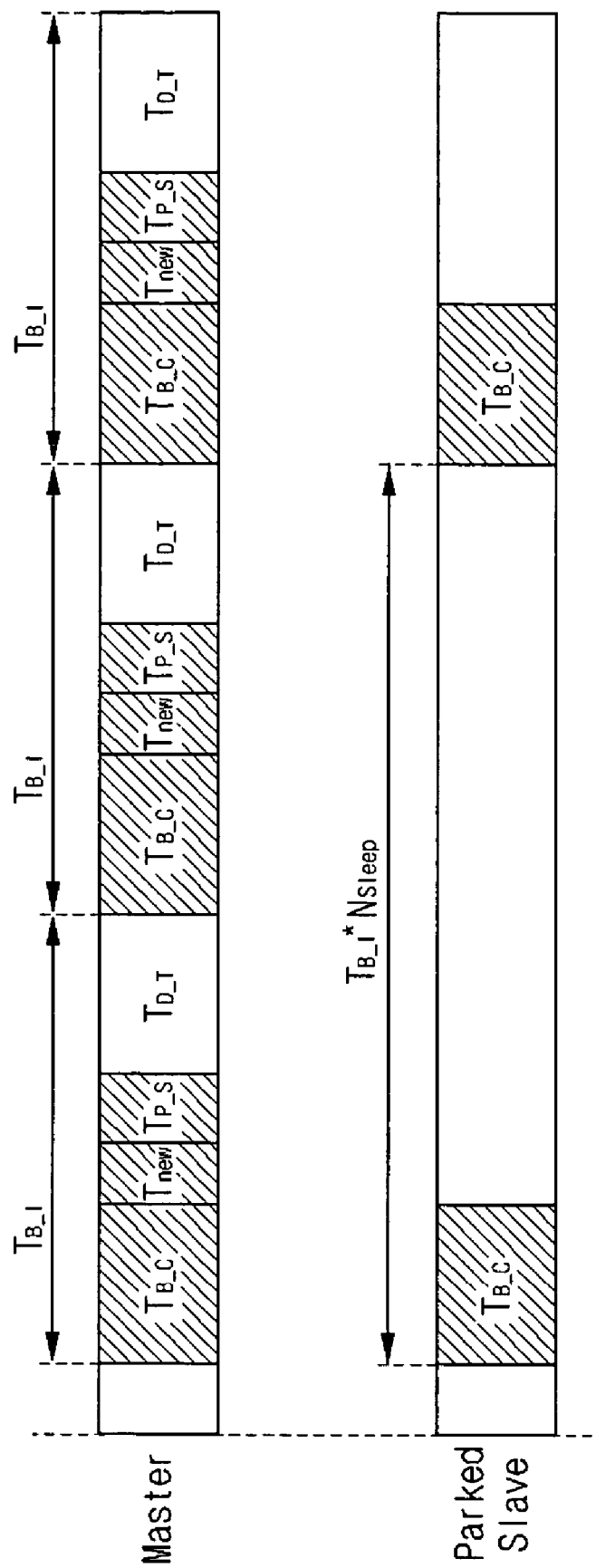
FIG. 6 is a timing diagram depicting an establishment of a Bluetooth channel according to a preferred embodiment of the present invention.
Figure 7:
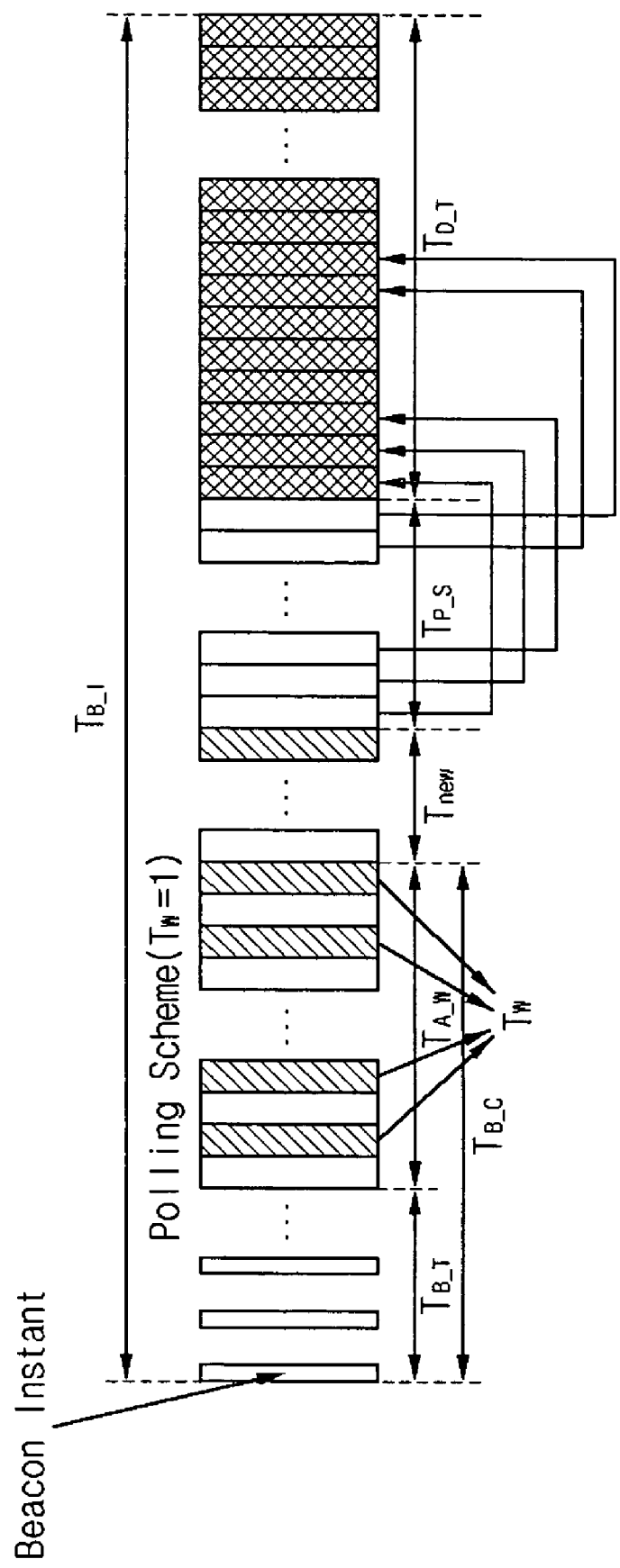
FIG. 7 is a detailed timing diagram illustrating a timing diagram of FIG. 6.

FIG. 6 is a timing diagram depicting an establishment of a Bluetooth channel according to a preferred embodiment of the present invention, and FIG. 7 is a detailed timing diagram depicting the timing diagram of FIG. 6.

Referring to FIGS. 5 to 7 in combination, while in a communication disconnection state with the master, the parked slaves maintain only timing synchronization with a period of beacon interval duration ($T_{B\_I}$). When there is data to be transmitted to or received from the master a parked slave transmits an access request message in order to establish a communication connection with the master during an access window duration ($T_{A\_W}$) of a beacon channel duration ($T_{B\_C}$) (S300). In FIG. 7, the beacon train duration ($T_{B\_T}$) is a duration for which a beacon instant is repetitively transmitted. In order to increase reception rates of the slave in the parking mode, it is desirable that the beacon instant is repetitively transmitted.

Further, a slot ($T_W$) of the access window duration is a slot allocated to one parked slave, and for this slot duration ($T_W$), the access request message is transmitted. Additionally, $T_{NEW}$ is a duration for which a new connection slave with the master is detected, and for this duration, an inquiry scan and paging scan procedure are performed.

In one embodiment of the present invention, the polling scheme is used to broadcast the beacon packet to all the parked slaves, and each of the slaves transmits the access request message for the access window duration ($T_{A\_W}$). In particular, in one embodiment the access window duration ($T_{A\_W}$) can be allocated to one slot, and in another embodiment, it is possible to allocate a plurality of slots considering a re-transmission scheme so as to increase an accessing probability of the slave.

Further, in other embodiments, it is also desirable that the master employs a slotted Collision Sense Multiple Access (CSMA) method or a Time Division Multiple Access (TDMA) method so as to provide a connection opportunity to all the parked slaves. The master receives all the access request messages that the parked slaves transmit in the pre-scheduling duration ($T_{P\_S}$) so as to determine the number of parked slave intending to communicate with the master at present (S310).

Further, according to the determined number of slaves desiring to communicate, the service sequence is determined with respect to a predetermined reference. In some instances the service sequence may be determined in a sequence of receiving the access request message in the master or, in other instances, the service sequence may be determined prioritizing slaves not transmitting data during earlier beacon interval durations ($T_{B\_I}$), so as to provide fairness of the system.

The first seven slaves having service allocated to them in the service sequence are served using seven Active Member Addresses, and additional slaves are maintained in sniff mode to be in the sleep state for a low power consumption, while they standby until served. Before the slaves enter sniff mode, each slave is, during pre-scheduling period ($T_{P\_S}$), allocated and given a sniff interval time (SIT) representing a wake-up time for the slave from the sniff mode to the active mode and an Active Member address (AM_ADDR) to be used after waking up (S320). In other words, according to the determined sequence, the master provides the service for all the slaves having data, using seven active member addresses (S330).

Next, the slaves in the sniff mode are woken up from the sleep state after the sniff interval time (SIT), and after receiving a polling signal from the master, communicate as active slaves (S350).

This operation is repeated until the services of all the slave earlier transmitting the access request message at the beacon channel duration ($T_{B\_C}$) are finished (S360).

Further, during the data transmission duration ($T_{D\_T}$), the slave performs the communication with the master one time, if the slave additionally has data to be transmitted, the slave can be continuously served until the beacon interval duration ($T_{B\_I}$) finishes. If the slave has not finishes communicating with the master at the close of the data transmission duration ($T_{D\_T}$), the slave is again, at next data transmission duration ($T_{D\_T}$), returned to and maintained on standby in the sniff mode in the last position of the slaves for the future data transmission (S370).

In various ways, the frame being scheduled at the data transmission duration ($T_{D\_T}$), can be transmitted. In one embodiment, after all of the slaves transmitting the access request message at the beacon channel duration ($T_{B\_C}$) are un-parked, the un-parked slaves are established in the frame, and after all of the slaves transmit data by one time, they enter the parking mode. This way is appropriate for appliance service in which a number of nodes such as a wire sensor network transmit small data very intermittently.

In another embodiment, all the up-parked slaves are bundled with the frame, and a service authority in the frame unit is given for the slaves. That is, during the data transmission duration ($T_{D\_T}$), data is sequentially transmitted in the frame unit, and when the data transmission duration ($T_{D\_T}$) finishes, all the slaves are automatically parked. Together with this, in a case where the slave, having the active member address (AM_ADDR) once allocated, after the next sniff interval time (SIT), still also has data to be transmitted, it is also possible to be again established for the data transmission. The slave completely finishing the data communication returns the active member address to the master, and returns to enter the parking mode (S380).

A communication apparatus for embodying the communication method of the above-described Bluetooth system will be described.

Figure 8:
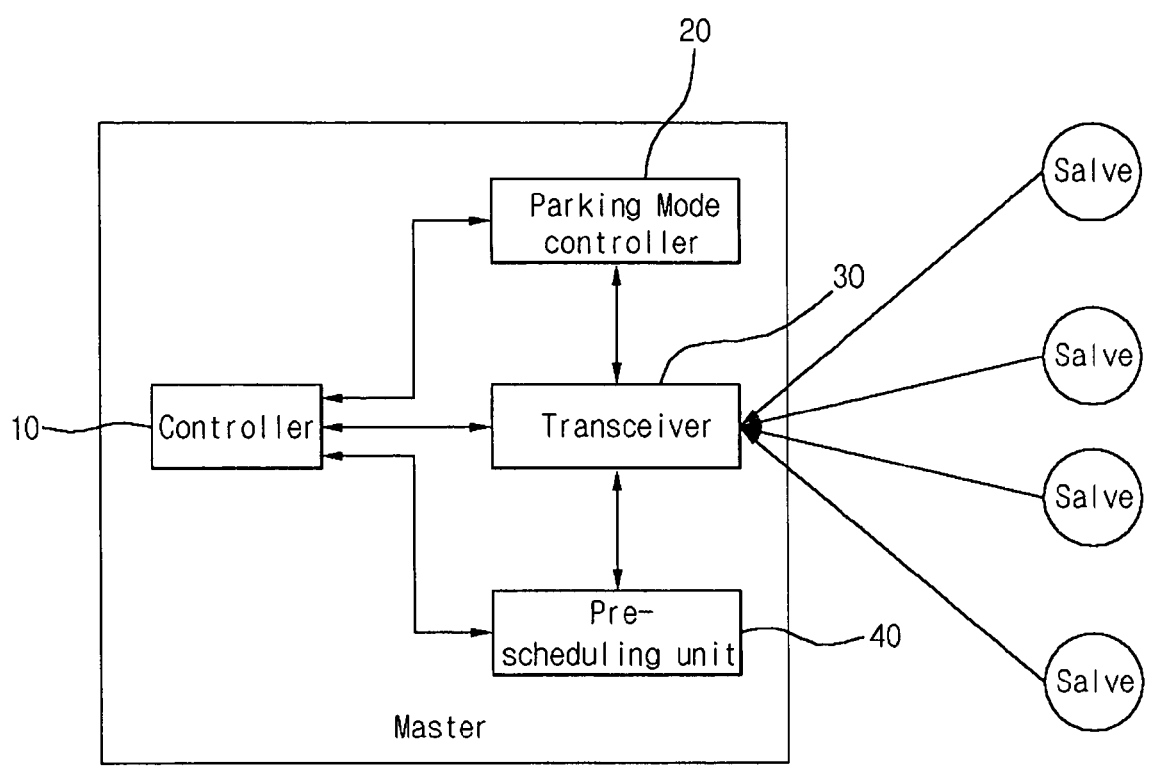
FIG. 8 is a block diagram illustrating a communication apparatus according to a preferred embodiment of the present invention.

FIG. 8 is a block diagram illustrating the communication apparatus according to a preferred embodiment of the present invention. Referring to the FIG. 8, the communication apparatus includes a transceiver 30, a pre-scheduling unit 40, a parking mode controller 20 and a controller 10.

The transceiver 30 processes a transmittance/reception signal between the master and the slave.

Further, the pre-scheduling unit 40 analyzes the signal received from the transceiver 30 so as to determine a sequence of the slaves to be served, and at this time, in order to convert the slaves to be in the sleep mode, it determines the sniff interval time (SIT) representing, in a slot unit, the time for which the sniff mode is maintained, and the Active Member Address (AM_ADDR) to be used after waking-up. Additionally, considering the fairness of the service, it is desirable that the service sequence is determined prioritizing the slaves not having data transmission during the beacon interval duration ($T_{B\_I}$) earlier. The pre-scheduling unit 40 can allow a kind of the packet to be automatically varied according to a communication throughput provided by the slave. This causes the throughput of the system to be increased and an unnecessary control packet to be prevented. For example, in case the slave has large data, a data high rate 5 (DH5) or DH 3 packet is used. In case the slave has small data, the sniff interval time (SIT) of the case using DH 1 packet or Data medium 1 (DM1) packet is calculated. This is because according to the kind of each packet, the number of the slot occupied is determined.

The parking mode controller 20 uses the reception signal from the transceiver 30 so as to calculate the number of the parked slave, an information type and the number of the packet that each of the slaves intends to transmit, and parameters necessary for the parking mode. The parameters include each kind of parameters used when the service using the parking mode is provided, for example, the number of the beacon slot, the number of the access window, the number of the slot per the access window, etc.

Lastly, the controller 10 controls the parking mode controller 20, the transceiver 30 and the pre-scheduling unit 40 such that, according to an established sequence of the pre-scheduling unit 40, the slave entering the sniff mode can become the active slave so as to perform the communication.

The following are graphs comparing the results according to the conventional Bluetooth system and the embodiment of the present invention so as to evaluate a performance of the present invention.

Calculation parameters for evaluating the performance of the present invention are expressed as the service delay time (Delay), the throughput, and the channel utilization.

Figure 9:
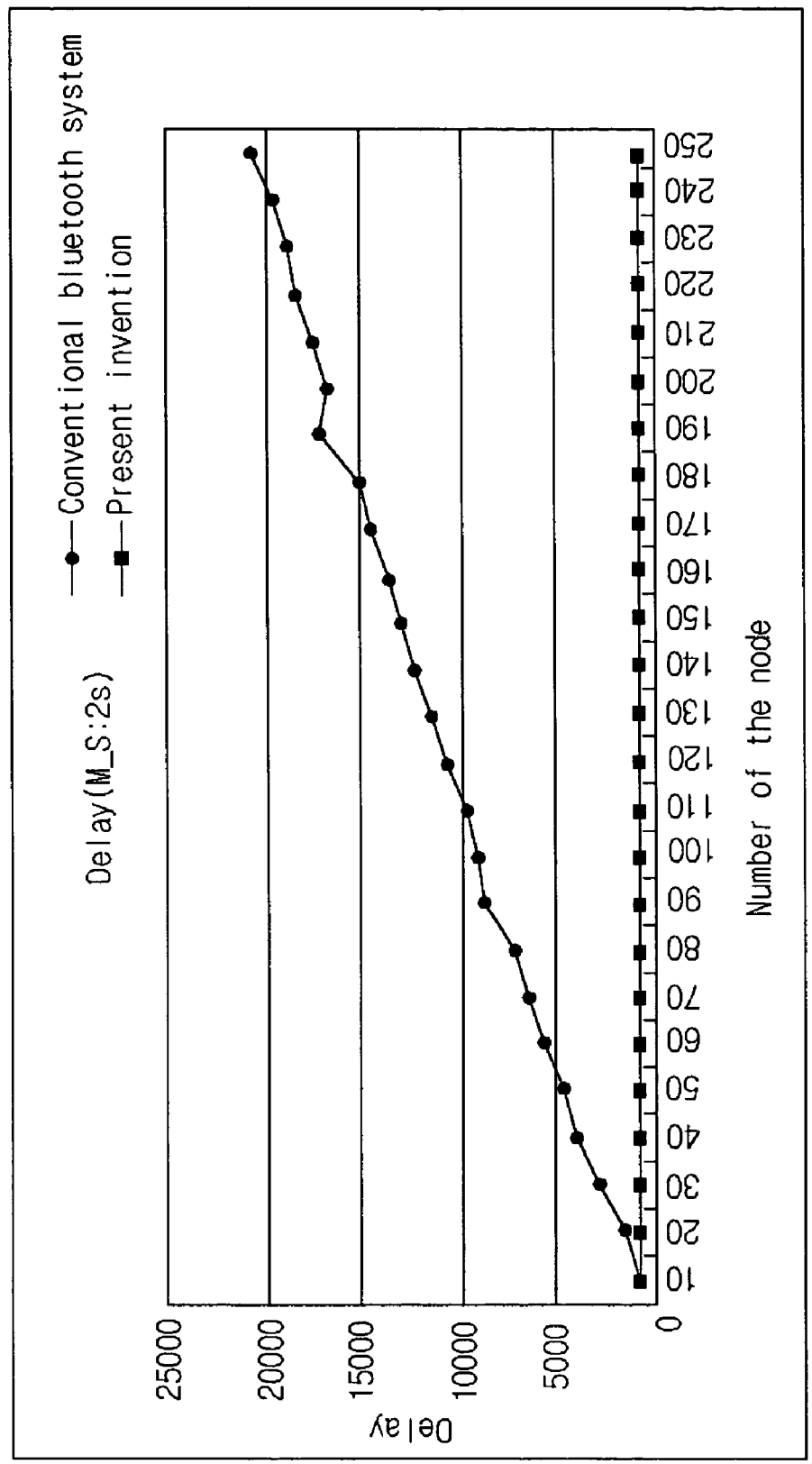
FIG. 9 is a graph depicting a delay time depending on the increasing number of a node as an experimental result according to a preferred embodiment of the present invention.
Figure 10:
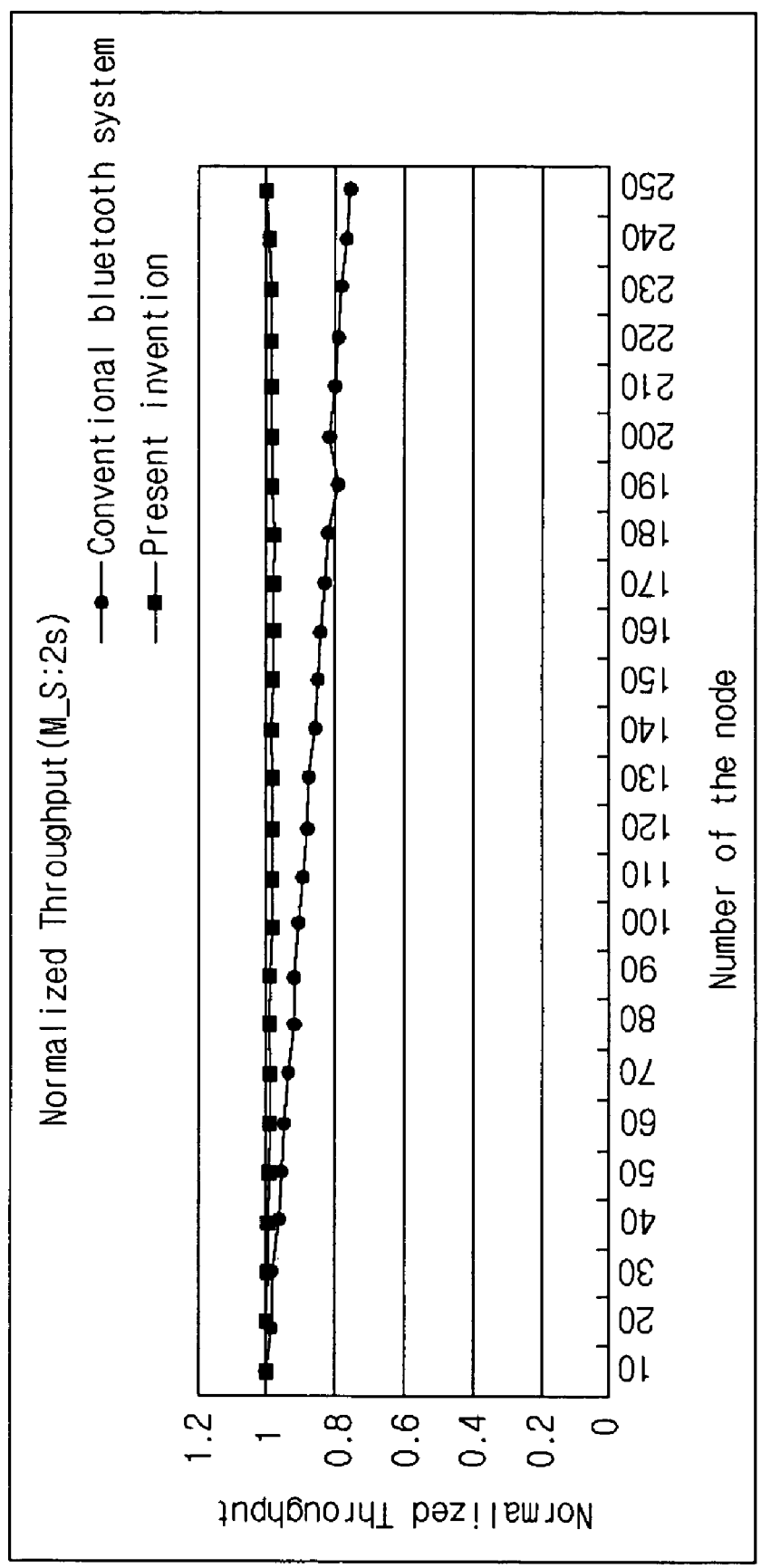
FIG. 10 is a graph depicting a throughput depending on the increasing number of a node as an experimental result according to a preferred embodiment of the present invention.
Figure 11:
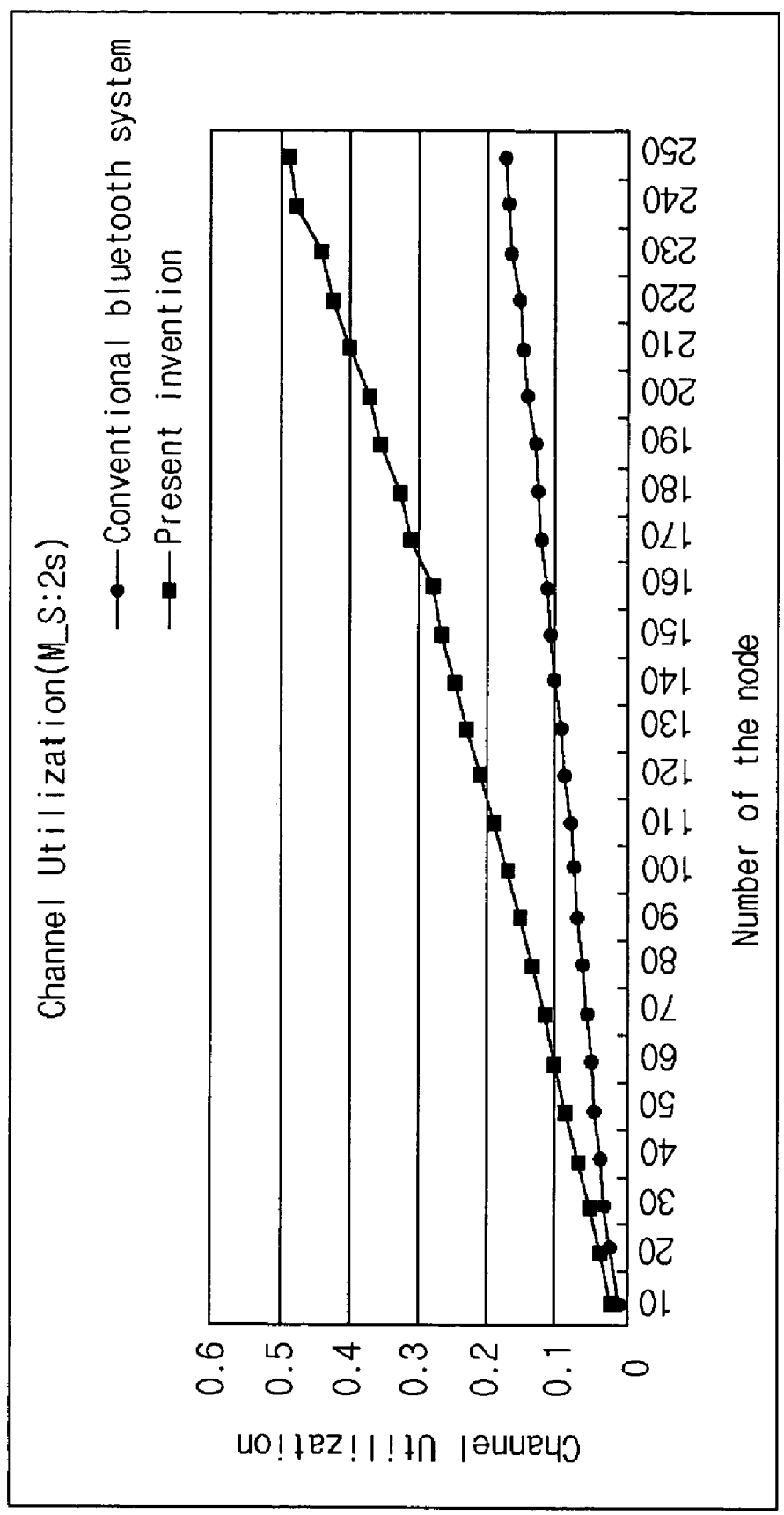
FIG. 11 is a graph depicting a channel utilization depending on the increasing number of a node as an experimental result according to a preferred embodiment of the present invention.

FIGS. 9, 10 and 11 are respectively the graphs illustrating the delay time, the throughput and the channel utilization depending on the increasing number of the node as experimental results according to a preferred embodiment of the present invention. In order to evaluate respective performances, a computer simulation is used, and each of the traffic generations is modeled. In other words, it is assumed that a fixed size of data is generated at respective nodes according to a Poisson distribution. In order to compare the performance of the conventional Bluetooth system and the present invention, the beacon interval duration ($T_{B\_I}$) is 1.28 seconds and an average traffic generation interval time is 2 seconds, and the number of the node are increased by 250.

As shown in FIG. 9, the delay time represents an average time taken to transmit one packet. In the conventional Bluetooth system, as the number of the node is increased, the service delay time is rapidly increased, while in the present invention, the service delay time is not almost varied.

FIG. 10 is a graph quantitatively illustrating the data throughput, and illustrates a ratio of transmission packet to the packet generated in one node. For example, a numeral 1 means that the packets generated from one node are all transmitted. As shown in the graph of FIG. 10, as the number of the node increases, the throughput is decreased in the conventional Bluetooth system, whereas in the present invention, all the packets are processed without deteriorating the performance.

As shown in FIG. 11, the graph illustrates that the channel utilization of the present invention is excellently high. This is because in the conventional Bluetooth system, though the data transmission duration ($T_{D\_T}$) is enough, since only seven slaves are received, until the next beacon channel duration ($T_{B\_C}$), a void slot is more generated.

As appreciated from the above-described embodiments, in the Bluetooth system according to the present invention, the master simultaneously provides the service for seven or more slaves to thereby provide an excellent performance of the data transmission delay, the throughput and the channel utilization in a whole system.

Further, the present invention solves a disadvantage of seven active slaves included in the Bluetooth system to thereby be capable of applying in various appliances. For example, in a wireless sensor network managing a number of nodes of processing small data, datum on a number of nodes can be efficiently accepted, and in a service hot spot such as an airport, even various web information users can be simultaneously served through the Bluetooth system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for communicating with seven or more terminals in a Bluetooth system having a master and a plurality of slaves, the method comprising the steps of:
    checking that an active member address remains available to be allocated to a new slave such that the master establishes a communication connection with the slave;
    in case an active member address remains available, allocating the remaining active member address to the slave, and in case no active member address remains available, calculating a service delay time and comparing the calculated delay time with a predetermined reference value;
    in case the service delay time is larger than the predetermined reference value, refusing a call acceptance, and in case the service delay time is smaller than the predetermined reference value, converting a slave that has requested the call to sniff mode and determining a service sequence with respect to a predetermined reference according to the number of the slave calculated at a pre-scheduling duration;
    allocating and giving a sniff interval time and an active member address to each of the slaves according to the service sequence, the sniff interval time being determined by an equation of $SIT=N*F+N_{th}$, (where "N" is the number of slaves intending to communicate with the master at present, "F" is a frame unit as a service sequence of a frame, and "$N_{th}$" is a slave position in one frame), and converting the slave allocated and given the sniff interval time and the active member address to be in a sniff mode; and
    waking of a slave from sniff mode at the sniff interval time and using the active member address to complete the communication with the active master and to return a use right of the active member address.

2. The method of claim 1, wherein the service sequence is determined in a sequence of receiving an access request message.

3. The method of claim 1, wherein data transmission between the master and the slave is such that until the slave given the active member address completes the data transmission, it is activated after the sniff interval time so as to repetitively transmit data.

4. The method of claim 1, wherein the slave having the service sequence determined is established in the frame unit for data transmission.

5. A method for communicating with seven or more terminals in a Bluetooth system having a master and a plurality of slaves, the method comprising the steps of:
    transmitting an access request message from a parked slave to the master so as to establish a communication connection there between;
    receiving the access request message so as to calculate the number of the parked slave and determine a service sequence with respect to a predetermined reference;
    allocating and giving a sniff interval time and an active member address according to the service sequence so as to establish the communication connection, the sniff interval time being determined by an equation of $SIT=N*F+N_{th}$, (where "N" is the number of slaves intending to communicate with the master at present, "F" is a frame unit as a service sequence of a frame, and "N$_{th}$" is a slave position in one frame), and maintaining a sleep state, by a non-connected slave, while a sniff mode is maintained; and waking the slave of the sniff mode at the sniff interval time such that the active member address is used to complete data transmission with the master and return to the sniff mode.

6. The method of claim 5, wherein the step of transmitting the access request message from the parked slave is performed by a slotted collision sense multiple access (CSMA) way.

7. The method of claim 5, wherein the step of transmitting the access request message from the parked slave is performed by a time division multiple access (TDMA) way.

8. The method of claim 5, wherein data transmission between the master and the slave is such that un-parked slaves are all established in a frame and data is transmitted in a frame unit.

9. The method of claim 5, wherein the service sequence is determined prioritizing the slave not completing the communication for a beacon interval duration earlier.

10. The method of claim 5, wherein the non-connection slave is given a sniff interval time and an active member address at a pre-scheduling duration.

11. The method of claim 5, wherein data transmission between the master and the slave is such that after all of the slaves transmitting the access request message are un-parked, the un-parked slaves are established in the frame and all of the slaves transmit data by one time.

12. The method of claim 5, wherein the service sequence is determined in a sequence of receiving the access request message.

13. The method of claim 5, wherein data transmission between the master and the slave is such that until the slave given the active member address completes the data transmission, it is activated after the sniff interval time so as to repetitively transmit data.

14. The method of claim 5, wherein the slave having the service sequence determined is established in the frame unit for data transmission.

15. An apparatus for communicating with seven or more terminals in a Bluetooth system having a master and a plurality of slaves, the apparatus comprising:

a transceiver for transmitting and receiving a signal between the master and the slave;

a parking mode controller for analyzing the signal received from the transceiver so as to control a number of a parked slave, a data type and a number of packets to be transmitted by each slave, and a parameter necessary for a sniff mode;

a pre-scheduling unit for analyzing the signal received from the transceiver and determining a service sequence, a sniff interval time determined by an equation of SIT=N*F+N$_{th}$, (where "N" is the number of slaves intending to communicate with the master at present, "F" is a frame unit as a service sequence of a frame, and "N$_{th}$" is a slave position in one frame), and an active member address to be used by a slave for communication with the master after the wake-up during the sniff interval time; and a controller for controlling the parking mode controller, the transceiver and the pre-scheduling unit to provide each slave with the sniff interval time and an active member address to be utilized by the slave that has been woken up after the sniff interval time to perform the communication according to the service sequence.

16. The apparatus of claim 15, wherein the pre-scheduling unit automatically varies a packet depending on a data throughput communicating with the slave.

17. The apparatus of claim 15, wherein the parking mode controller controls parameters of the number of a beacon slot, the number of an access window, and the number of a slot per a window.

* * * * *

UNITED STATES PATENT AND TRADEMARK OFFICE
CERTIFICATE OF CORRECTION

PATENT NO.        : 7,539,457 B2
APPLICATION NO.   : 10/822325
DATED             : May 26, 2009
INVENTOR(S)       : Jae Sung Lim et al.

It is certified that error appears in the above-identified patent and that said Letters Patent is hereby corrected as shown below:

On the title page item (73) should read Assignee: Ajou University Industry Cooperation Foundation. Suwon-Si, Kyeonggi-Do (KR)

Signed and Sealed this

Eighteenth Day of August, 2009

David J. Kappos
*Director of the United States Patent and Trademark Office*